United States Patent [19]

Ramazzotti et al.

[11] Patent Number: 4,460,140
[45] Date of Patent: Jul. 17, 1984

[54] HOSE SUPPORT

[75] Inventors: Dario J. Ramazzotti; Sherman E. Cohen, both of Atlanta, Ga.

[73] Assignee: Nordson Corporation, Amherst, Ohio

[21] Appl. No.: 430,283

[22] Filed: Sep. 30, 1982

[51] Int. Cl.³ .............................................. A62C 23/04
[52] U.S. Cl. ..................................................... 248/75
[58] Field of Search ....................... 248/75, 79, 82, 92, 248/93; 285/114, 115, 116; 222/146 HE, 260

[56] References Cited

U.S. PATENT DOCUMENTS

| 1,504,945 | 8/1924 | Dempsey et al. | 285/114 |
| 1,627,734 | 5/1927 | Gavaza | 248/79 |
| 4,163,457 | 8/1979 | Rickel et al. | 248/75 |
| 4,367,857 | 1/1983 | McCarthy | 248/75 |

Primary Examiner—William H. Schultz
Assistant Examiner—Ramon O. Ramirez
Attorney, Agent, or Firm—Michael L. Gill; Edmund J. Wasp; Stephen T. Belsheim

[57] ABSTRACT

A support for a flexible heated dispensing hose comprising a hollow cylinder having opposite ends. A bracket attaches the cylinder to the dispenser. A helical spring is contained within the cylinder and extends beyond the opposite ends thereof. The hose is supported by the spring and cylinder so that the hose is free to move from side to side, the hose is prevented from kinking, abrasion of the hose against the cylindrical member is reduced, and optimum ventilation of the hose is provided.

6 Claims, 3 Drawing Figures

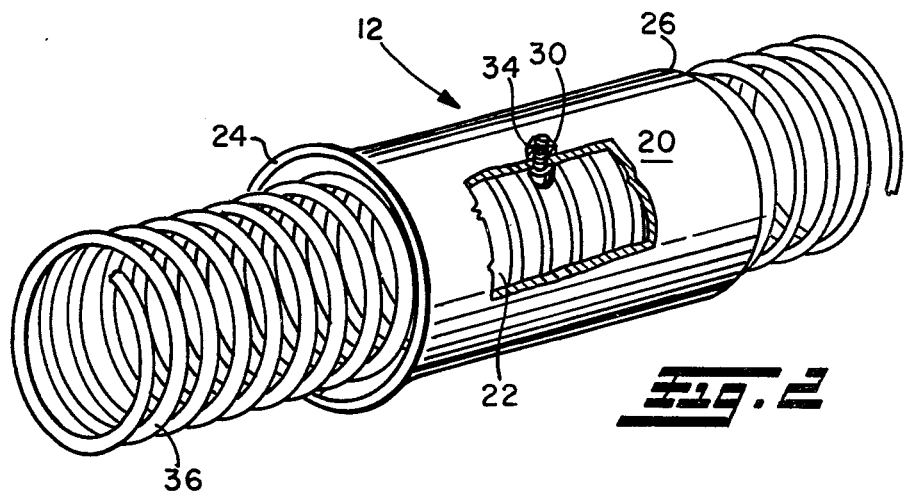
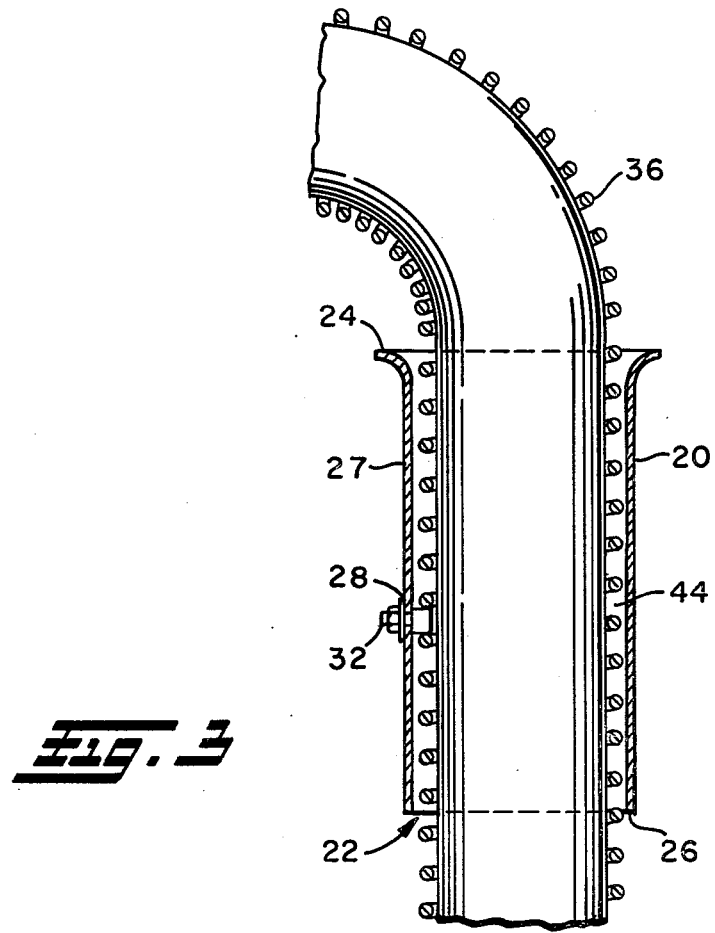

HOSE SUPPORT

BACKGROUND OF THE INVENTION

The invention relates to a support for a flexible hose, and in particular, to a support for a flexible heated hose through which a viscous fluid is carried.

Molten hot melt adhesive is dispensed through a dispenser that is connected to a source of molten hot melt adhesive by a heated hose. In the case of an electrically heated hose, the hose has an exterior layer of insulation as well as interior heating wires. These wires are relatively fine and are subject to breakage if the hose is kinked or twisted. The insulation is also subject to abrasion.

In the bulk application of hot melt adhesive, the heated hose is supported at some point along its length by a hose support. Earlier hose supports have adequately performed their function. Nonetheless, hoses have experienced kinking, limited movement, abrasion and less than optimum ventilation when supported by earlier hose supports.

It would thus be desirable to provide a support for a flexible hose that reduces the tendency of the hose to kink, allows the hose to move (including side-to-side movement) without undue limitation, reduces the occurrence of hose abrasion, and provides improved ventilation of the hose.

SUMMARY OF THE INVENTION

The invention is a support for a flexible hose comprising a hollow cylinder having opposite ends. A bracket attaches the cylinder to a dispenser. A helical spring is contained within the cylinder and extends beyond the opposite ends of the cylinder. The hose is supported by the spring and cylinder.

BRIEF DESCRIPTION OF THE DRAWINGS

Further objects and features of the invention will be apparent from the following description of an embodiment of the invention in connection with accompanying drawings. It should be understood that this description is in no way limiting and that various changes may be brought to the disclosed embodiment without departing from the scope of the invention.

FIG. 2 is a perspective view of the support of FIG. 1 having a portion of the cylindrical wall cut away and the hose removed; and FIG. 3 is a cross-sectional view of the hose support and hose of FIG. 1.

DETAILED DESCRIPTION OF THE SPECIFIC EMBODIMENT

Figure 1:
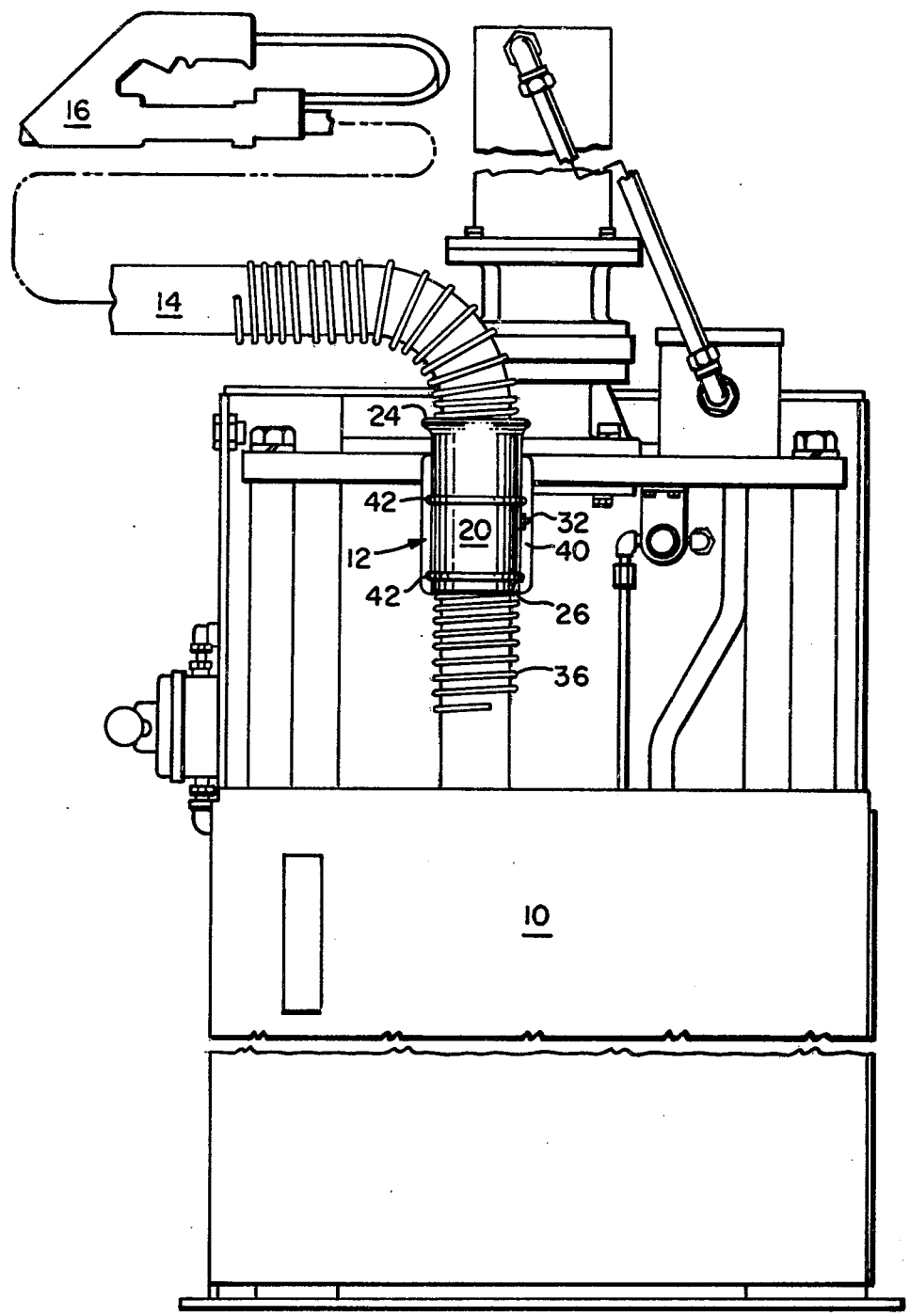
FIG. 1 is a rear view of a bulk dispenser of hot melt adhesive illustrating the attachment of a specific embodiment of the hose support to the bulk dispenser.

Referring to the drawings, in FIG. 1 there is illustrated a bulk melter 10 having a hose support 12 connected thereto. A hose 14 extends from bulk melter 10 and is supported by hose support 12.

The operation of a bulk melter is described in U.S. Pat. No. 4,073,409 issued on Feb. 14, 1978, and assigned to the assignee of this patent application. In general, the bulk melter heats solid hot melt adhesive into its molten state and the molten hot melt adhesive is then pumped by the bulk melter through hose 14 into a dispensing gun. In this case the gun is shown as a hand gun 16.

Referring to FIG. 2, hose support 12 includes a hollow cylinder 20. Hollow cylinder 20 includes a passage 22 therethrough and opposite top and bottom ends 24 and 26, respectively. The side wall 27 of cylinder 20 includes a pair of offset holes 28 and 30 therein. Holes 28 and 30 are disposed at about 180° apart and are offset so as not to be in the same generally horizontal plane.

Screws 32 and 34 are threaded in holes 28 and 30, respectively. Helical spring 36 is then threaded into passage 22 so as to engage screws 32 and 34. The relative orientation between screws 32 and 34 is such as to correspond to the pitch of helical spring 36.

As illustrated in FIG. 1, hose support 12 is connected to the bulk melter by a bracket 40 mounted to the bulk melter and a pair of U bolts 42 mounted to bracket 40. U-bolts 42 surround the exterior surface of hose support 12.

Referring to FIG. 3, the relative orientation between the spring 36, cylinder 20 and hose 14 is illustrated. The spring is stiff enough so as to sufficiently support hose 14 so that it does not kink about one (or proximate) end 24 of hollow cylinder 20.

Spring 36 is also sufficiently flexible so as to allow hose 14 to move side-to-side without undue limitation. Thus, an operator can move from place to place dispensing fluid and the hose will easily move in a side-to-side fashion.

Spring 36 contacts one end 24 of hollow cylinder. Thus, upon the movement of the hose from side-to-side the spring, not the hose covering, rides over the surface of one end 24. The result being to significantly reduce the potential for abrading the outer covering of hose 14 when the hose moves.

The spring 36 can be screwed up or down on the screws 32 and 34 thus changing the effective length of the spring 36 extending beyond end 24 of hollow cylinder 20. This alters the bend radius of the hose 14 as it exits hollow cylinder 20. Thus for a light weight hose, the spring 36 would extend upwardly as much as possible from hollow cylinder 20 (always keeping some portion of the spring 36 extending past end 26) to give a gentle bend radius and maximum support to the hose. Whereas on a heavy, large diameter hose 14, the spring 36 would extend minimally beyond end 24 of hollow cylinder 20 in order to give maximum support to the hose.

In addition, as can be seen, spring 36 maintains the outer surface of hose 14 in a spaced apart relationship to the inner surface of hollow cylinder 20. This spacing provides an air gap 44 which allows air to flow by the hose thereby providing optimum ventilation for heated hose 14.

While we have disclosed a specific embodiment of our invention, persons skilled in the art of which this invention pertains will readily appreciate changes and modifications which may be made in the invention. Therefore, we do not intend to be limited except by the scope of the following appended claims.

We claim:
1. A fluid applicator comprising:
 a means for providing a pressurized supply of fluid;
 a flexible hose having one end connected to said providing means and the other end connected to a dispenser;
 a cylindrical tube mounted to said applicator, a helical spring positioned within said tube, said spring being of such a length so that the free ends thereof extend beyond each end of said tube and being less than the length of said hose; and said hose passing through said spring, said spring supporting said hose away from said tube.

2. The fluid applicator of claim 1 wherein said hose is spaced from the ends of said tube so that the hose is not kinked about the proximate end of said tube.

3. The fluid applicator of claim 1 wherein said spring slidingly contacts the ends of said tube so that the hose is not abraided upon the movement thereof.

4. The fluid applicator of claim 1 wherein the spring supports said hose so that the hose is free to move side to side.

5. The fluid applicator of claim 1 said spring is adjustably positioned within said tube so that the length of said spring extending beyond each end of said tube may be selected.

6. A fluid applicator comprising:

a means for providing a pressurized supply of fluid;

a flexible hose having one end connected to said providing means and the other end connected to a dispenser;

a cylindrical tube mounted to said applicator, a helical spring positioned within said tube, said spring being of such a length so as to extend beyond each end of said tube; and said hose passing through said spring, said spring supporting said hose away from said tube so that the entire circumference of that portion of said hose contained within said tube is spaced apart from the interior surface of said tube so that air may flow between said hose and said interior surface.

* * * * *